United States Patent
Park et al.

(10) Patent No.: US 10,550,237 B2
(45) Date of Patent: Feb. 4, 2020

(54) PLASTIC FILM AND A METHOD FOR PREPARING THE SAME

(71) Applicant: LG CHEM, LTD., Seoul (KR)

(72) Inventors: Jin Young Park, Daejeon (KR); Soon Hwa Jung, Daejeon (KR); Han Na Lee, Daejeon (KR); Yeong Rae Chang, Daejeon (KR); Joon Koo Kang, Daejeon (KR); Hyeok Jeong, Daejeon (KR); Eun Kyu Her, Daejeon (KR)

(73) Assignee: LG CHEM, LTD., Seoul (KR)

( * ) Notice: Subject to any disclaimer, the term of this patent is extended or adjusted under 35 U.S.C. 154(b) by 371 days.

(21) Appl. No.: 15/037,846

(22) PCT Filed: Nov. 24, 2014

(86) PCT No.: PCT/KR2014/011324
§ 371 (c)(1),
(2) Date: May 19, 2016

(87) PCT Pub. No.: WO2015/076632
PCT Pub. Date: May 28, 2015

(65) Prior Publication Data
US 2016/0289407 A1 Oct. 6, 2016

(30) Foreign Application Priority Data

Nov. 25, 2013 (KR) .................. 10-2013-0143975
Nov. 21, 2014 (KR) .................. 10-2014-0163754

(51) Int. Cl.
*C08J 7/04* (2006.01)
*B05D 3/06* (2006.01)
(Continued)

(52) U.S. Cl.
CPC .............. *C08J 7/042* (2013.01); *B05D 3/067* (2013.01); *C08J 3/28* (2013.01); *C09D 133/062* (2013.01); *B32B 7/02* (2013.01)

(58) Field of Classification Search
CPC ........ C09D 133/00–133/26; C09D 4/00–4/06; C08J 5/00–5/24; C08J 7/00–7/18;
(Continued)

(56) References Cited

U.S. PATENT DOCUMENTS

2013/0130002 A1* 5/2013 Lee ...................... G02F 1/1333
428/216
2015/0166750 A1 6/2015 Kang et al.

FOREIGN PATENT DOCUMENTS

EP 2644631 A1 10/2013
EP 2840107 A1 2/2015
(Continued)

OTHER PUBLICATIONS

Machine translation of JP2010-024255. Retrieved Aug. 5, 2018.*
(Continued)

*Primary Examiner* — Prashant J Khatri
(74) *Attorney, Agent, or Firm* — Rothwell, Figg, Ernst & Manbeck, P.C.

(57) ABSTRACT

A plastic film including a supporting substrate, a first coating layer which is formed on one side of the supporting substrate, and a second coating layer which is formed on another side of the supporting substrate, and a method for preparing the plastic film. More specifically, the plastic film has high hardness. According to the plastic film of the present invention and the preparation method thereof, it is possible to prepare a plastic film of high hardness which is less prone to curling easily.

15 Claims, 2 Drawing Sheets

(51) Int. Cl.
  *C08J 3/28* (2006.01)
  *C09D 133/06* (2006.01)
  *B32B 7/02* (2019.01)

(58) Field of Classification Search
  CPC ... C08J 3/00–3/20; C08G 75/00–75/32; B05D 3/00–3/207
  See application file for complete search history.

(56) References Cited

FOREIGN PATENT DOCUMENTS

| | | | |
|---|---|---|---|
| JP | 08286001 A | * | 11/1996 |
| JP | H11-333370 A | | 12/1999 |
| JP | 2001-302943 A | | 10/2001 |
| JP | 2004-091765 A | | 3/2004 |
| JP | 2008-133367 A | | 6/2008 |
| JP | 2008-297350 A | | 12/2008 |
| JP | 2010024255 A | * | 2/2010 |
| JP | 2010-085985 A | | 4/2010 |
| JP | 2010-208035 A | | 9/2010 |
| JP | 2011-021151 A | | 2/2011 |
| JP | 2011-201087 A | | 10/2011 |
| JP | 2011246548 A | * | 12/2011 |
| JP | 2012-072235 A | | 4/2012 |
| KR | 10-1998-020031 A | | 6/1998 |
| KR | 10-2000-0059808 A | | 10/2000 |
| KR | 10-2004-0094153 A | | 11/2004 |
| KR | 10-2010-0041992 A | | 4/2010 |
| KR | 10-2010-0077798 A | | 7/2010 |
| KR | 10-2011-0079522 A | | 7/2011 |
| KR | 10-2011-0092797 A | | 8/2011 |
| KR | 10-1093721 B1 | | 12/2011 |
| KR | 10-2013-0087576 A | | 8/2013 |
| TW | 200829961 A | | 7/2008 |
| TW | 201232861 A | | 8/2012 |
| WO | 00-47666 A1 | | 8/2000 |

OTHER PUBLICATIONS

Machine translation of JPH08-286001. Retrieved Aug. 6, 2018.*
Machine translation of JP2011-246548. Retrieved Jun. 13, 2017.*
"D3363-05: Standard Test Method for Film Hardness by Pencil Test". ASTM International, (2011); pp. 1-3.*
Extended European Search Report issued for European Patent Application No. 14864075.8 dated Jul. 19, 2017, 6 pages.
Search Report issued for International Application No. PTC/KR2014/011324 dated Mar. 5, 2015 (2 pages).

* cited by examiner

PLASTIC FILM AND A METHOD FOR PREPARING THE SAME

CROSS-REFERENCE TO RELATED APPLICATIONS

This application is a 35 U.S.C. § 371 National Phase Entry Application from PCT/KR2014/011324, filed on Nov. 24, 2014, and designating the United States, which claims priority under 35 U.S.C. § 119 to Korean Patent Application No. 10-2013-0143975, filed on Nov. 25, 2013, and Korean Patent Application No. 10-2014-0163754, filed on Nov. 21, 2014, the entire contents of which are incorporated herein by reference.

BACKGROUND OF THE INVENTION

(a) Field of the Invention

The present invention relates to a plastic film and a method for preparing the same. More specifically, the present invention relates to a plastic film which shows high hardness and is less prone to curling, bending or cracking and a method for preparing the same.

(b) Description of the Related Art

With the advance of mobile appliances such as smart phones, tablet PCs and the like, substrates for displays have recently been required to become lighter and slimmer. Display windows or front panels of such mobile appliances are generally made of glass or reinforced glass both of which have excellent mechanical properties. However, glass suffers from the disadvantage of being heavy and being easily broken by an external impact.

As an alternative to glass, plastic resin films have emerged. Their light weight and resistance to impact are consistent with the trend of pursuing lighter and slimmer mobile appliances. Particularly, a film with high hardness and wear resistance is required. In this regard, it is proposed to utilize a structure in which the substrate is coated with a coating layer.

First of all, increasing the thickness of the coating layer is considered as an approach to improving the surface hardness thereof. In fact, the coating layer should be of a certain thickness to ensure the surface hardness sufficient to replace glass. As the coating layer increases in thickness, the surface hardness thereof may become higher. However, a thicker coating layer, although increasing the surface hardness, is more prone to setting shrinkage which leads to wrinkling or curling with the concomitant production of cracks or exfoliations, and thus thick coating layers are difficult to employ in practice.

Recently, some methods have been proposed for conferring a high hardness on plastic films, without the problems of cracking and setting shrinkage-induced curling.

Korean Patent Application Publication No. 2010-0041992 discloses a plastic film composition, free of monomers, comprising a binder resin based on ultraviolet-curable polyurethane acrylate oligomers. However, the plastic film has a pencil hardness of about 3H, and thus the strength thereof is not sufficient to be a substitute for glass panels for displays.

SUMMARY OF THE INVENTION

Accordingly, the present invention provides a plastic film which exhibits high hardness and is less prone to curling, bending or cracking, and a method for preparing the same, for resolving the problems.

In accordance with an aspect thereof, the present invention provides a plastic film, including:

a supporting substrate;

a first coating layer which is formed on one side of the supporting substrate; and a second coating layer which is formed on another side of the supporting substrate, wherein the first and the second coating layers include a crosslinking copolymer of a 3- to 6-functional acrylate compound and a thiol-containing compound, and inorganic particles independently equally or differently, and the plastic film shows a pencil hardness of 7H or more at the load of 1 kg.

Furthermore, the method for preparing the same of the present invention includes the steps of:

coating a first coating composition including a first binder, first inorganic particles, and a first photoinitiator on one side of a supporting substrate;

carrying out a first photo-curing by exposing the side on which the first coating composition is coated to UV light having a first wavelength until the first binder is partially crosslinked;

coating a second coating composition including a second binder, second inorganic particles, and a second photoinitiator on the other side of the supporting substrate; and carrying out a second photo-curing by exposing the other side on which the second coating composition is coated to UV light having the first wavelength and a second wavelength that is longer than the first wavelength, wherein the first binder and the second binder are equal to or different from each other and include a 3- to 6-functional acrylate compound and a thiol-containing compound independently.

According to the method for preparing the plastic film, it is possible to prepare a plastic film of high hardness which is less prone to curling easily.

Since the plastic film obtained by the preparation method exhibits high hardness, scratch resistance, and transparency and is less prone to curling or cracking with its excellent processability, it can be usefully applied to a front panel, a display unit, and the like of mobile devices, display devices, and instrument panels as an alternative to glass.

DETAILED DESCRIPTION OF THE EMBODIMENTS

The plastic film of the present invention includes:

a supporting substrate;

a first coating layer which is formed on one side of the supporting substrate; and a second coating layer which is formed on another side of the supporting substrate, wherein the first and the second coating layers include a crosslinking copolymer of a 3- to 6-functional acrylate compound and a thiol-containing compound, and inorganic particles independently equally or differently, and the plastic film shows a pencil hardness of 7H or more at the load of 1 kg.

Furthermore, the method for preparing the same of the present invention includes the steps of:

coating a first coating composition including a first binder, first inorganic particles, and a first photoinitiator on one side of a supporting substrate;

carrying out a first photo-curing by exposing the side on which the first coating composition is coated to UV light having a first wavelength until the first binder is partially crosslinked;

coating a second coating composition including a second binder, second inorganic particles, and a second photoinitiator on the other side of the supporting substrate; and carrying out a second photo-curing by exposing the other side on which the second coating composition is coated to UV light having the first wavelength and a second wavelength that is longer than the first wavelength, wherein the first binder and the second binder are equal to or different from each other and include a 3- to 6-functional acrylate compound and a thiol-containing compound independently.

In the present invention, the terms 'the first', 'the second', and so on are used for explaining various elements, and the terms are only used for the purpose of distinguishing one element from the other elements.

Furthermore, all of the terms used in the specification are taken only to illustrate embodiments, and are not intended to limit the present invention. As used herein and in the appended claims, the singular forms "a", "an", and "the" include plural reference unless the context clearly dictates otherwise. It must be understood that the terms such as "include", "equip", and "have" in the present description are only used for designating the existence of characteristics taken effect, numbers, steps, components, or combinations thereof, and do not exclude the existence or the possibility of addition of one or more different characteristics, numbers, steps, components of combinations thereof beforehand.

Additionally, the word "on" or "above," as used in the context of formation or construction of one element, means pertaining to the direct formation or construction of one element on another element directly or the additional formation or construction of one element between layers or on a subject or substrate.

The above detailed descriptions of embodiments of the present invention are not intended to be exhaustive or to limit the invention to the precise form disclosed above. While specific embodiments of, and examples for the invention are described above for illustrative purposes, various equivalent modifications are possible within the scope of the invention, as those skilled in the relevant art will recognize.

Hereinafter, the plastic film of the present invention and the preparation method thereof are explained in more detail by referring to annexed drawings.

According to one embodiment, the present invention provides the method for preparing the plastic film including the steps of coating a first coating composition including a first binder, first inorganic particles, and a first photoinitiator on one side of a supporting substrate; carrying out a first photo-curing by exposing the side on which the first coating composition is coated to UV light having a first wavelength until the first binder is partially crosslinked; coating a second coating composition including a second binder, second inorganic particles, and a second photoinitiator on the other side of the supporting substrate; and carrying out a second photo-curing by exposing the other side on which the second coating composition is coated to UV light having the first wavelength and a second wavelength that is longer than the first wavelength, wherein the first binder and the second binder are equal to or different from each other and include a 3- to 6-functional acrylate compound and a thiol-containing compound independently.

In the method for preparing the plastic film of the present invention, the first coating composition including the first binder, the first inorganic particles, and the first photoinitiator is coated on one side of a supporting substrate.

In the method for preparing the plastic film of the present invention, so long as it is transparent, any plastic resin, whether capable of being stretched or not, may be used for the supporting substrate on which the first coating composition is coated. According to one embodiment of the present invention, the supporting substrate may include, for example, a polyester such as polyethyleneterephtalate (PET), a polyethylene such as ethylene vinyl acetate (EVA), cyclic olefin polymer (COP), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), triacetylcellulose (TAC), MMA (methyl methacrylate), or a fluoro-polymer. The substrate may be a single layer structure, and, if necessary, may be a multilayer structure including two or more layers composed of the same or different materials, but is not particularly limited.

According to one embodiment of the present invention, the supporting substrate may be a multilayer substrate made of polyethyleneterephthalate (PET) or a two-layer substrate formed by coextrusion of polymethylmethacrylate (PMMA)/polycarbonate (PC).

Furthermore, according to one embodiment of the present invention, the supporting substrate may be a substrate including a copolymer of polymethylmethacrylate (PMMA) and polycarbonate (PC).

The thickness of the supporting substrate may be about 30 to about 1,200 μm, or about 50 to about 800 μm, but is not limited thereto.

The first coating composition coated on one side of the supporting substrate includes the first binder, the first inorganic particles, and the first photoinitiator, and the first binder includes a 3- to 6-functional acrylate compound and a thiol-containing compound.

As used herein, the term "acrylate" is intended to encompass acrylate, methacrylate, and derivatives thereof with various substituents.

The 3- to 6-functional acrylate compound may be trimethylolpropane triacrylate (TMPTA), trimethylolpropaneethoxy triacrylate (TMPEOTA), glycerin-propoxylated triacrylate (GPTA), pentaerythritol triacrylate (PETA), pentaerythritol tetraacrylate, dipentaerythritol hexaacrylate (DPHA), and the like. These 3- to 6-functional acrylate compounds may be used alone or in combination.

As used herein, the term "thiol-containing compound" is intended to encompass a compound including one or more thiol groups (S—H), preferably 2 or more thiol groups, therein.

The thiol-containing compound has high degree of photo-curing and low degree of curing shrinkage, and when it is coated and photo-cured by being mixed with the 3- to 6-functional acrylate compound, the thiol-containing compound and the 3- to 6-functional acrylate compound are cured and crosslinked together by a thiol-ene reaction, and form a crosslinking copolymer. Accordingly, the coating layer including the crosslinking copolymer can show high hardness with less curling or cracking.

The thiol-containing compound may be, for example, pentaerythritol tetrakis thioglycolate, pentaerythritol tetrakis (2-mercaptoacetate), pentaerythritol tris(3-mercaptoacetate), trimethylolpropane tris(3-mercaptopropionate), trimethylolpropane tetrakis(3-mercaptopropionate), trimethylolpropane tris(3-mercaptobutylrate), mercaptopropyl isobutyl silsesquioxane, mercaptopropyl isooctyl silsesquioxane, and so on, but it is not limited to or by them. These thiol-containing compounds may be used alone or in combination.

According to one embodiment of the present invention, the content ratio of the 3- to 6-functional acrylate compound and the thiol-containing compound is not limited particularly, but the weight ratio of the 3- to 6-functional acrylate compound and the thiol-containing compound may be about 99:1 to about 60:40, or about 90:10 to about 70:30. When the first binder includes the 3- to 6-functional acrylate compound and the thiol-containing compound in the weight ratio disclosed above, high hardness and flexibility can be realized without deterioration of other properties such as curl property and light resistance.

According to one embodiment of the present invention, the first binder may further include a 1- to 2-functional acrylate compound. The 1- to 2-functional acrylate compound may be hydroxyethylacrylate (HEA), hydroxyethylmethacrylate (HEMA), hexanedioldiacrylate (HDDA), tripropyleneglycol diacrylate (TPGDA), ethyleneglycol diacrylate (EGDA), and the like. The 1- to 2-functional acrylate compounds also may be used alone or in combination.

According to one embodiment of the present invention, the content of the first binder may be about 35 to about 85 parts by weight or about 45 to about 80 parts by weight per 100 parts by weight of the first coating composition. When the content of the first binder is in said range, the plastic film that shows high hardness and is less prone to curling or cracking generation can be formed with excellent processability.

In the method for preparing the plastic film of the present invention, the first coating composition includes the first inorganic particles.

According to one embodiment of the present invention, the first inorganic particle may have a particle size of nanoscale. For example, inorganic particles having the diameter of about 100 nm or less, about 10 to about 100 nm, or about 10 to about 50 nm may be used. And, for example, silica particles, aluminum oxide particles, titanium oxide particles, or zinc oxide particles may be used as the first inorganic particles.

The hardness of the plastic film may be more improved by including the first inorganic particles.

According to one embodiment of the present invention, the content of the first inorganic particles may be about 10 to about 60 parts by weight or about 20 to about 50 parts by weight per 100 parts by weight of the first coating composition. When the content of the first inorganic particles is in said range, the properties of the first coating composition do not decrease and it is possible to achieve the effect of improving the hardness of the plastic film according to the addition of the inorganic particles.

In the method for preparing the plastic film of the present invention, the first coating composition includes the first photoinitiator.

The first photoinitiator may be selected according to the wavelength range to be absorbed. According to one embodiment of the present invention, the first photoinitiator may be a mixture including the materials which can initiate the photo-polymerization by absorbing the UV light of the first wavelength range used in the first photo-curing step or the UV light of the second wavelength range used in the second photo-curing step. Furthermore, according to one embodiment of the present invention, the first photoinitiator may be a photoinitiator which can absorb the UV light of the first wavelength range and the second wavelength range together.

More particularly, the photoinitiator absorbing the UV light of the first wavelength range may be 1-hydroxycyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, and the like. Furthermore, the photoinitiator may be commercially available, such as those sold under brand name, Irgacure 184, Irgacure 500, Irgacure 651, Irgacure 369, Irgacure 907, Darocur 1173, Darocur MBF, and so on.

The photoinitiator absorbing the UV light of the second wavelength range may be diphenyl(2,4,6-trimethylbenzoyl)-phosphine oxide, bis(2,4,6-trimethylbenzoyl)-phenylphosphine oxide, and the like. Furthermore, the photoinitiator may be commercially available, such as those sold under brand name, Irgacure 819, Irgacure 907, Esacure KIP 100F, and so on.

The mixing ratio of the photoinitiator absorbing the UV light of the first wavelength range and the photoinitiator absorbing the UV light of the second wavelength range is not limited particularly and it is possible to mix them in a proper ratio with necessity.

Among the photoinitiators, Darocur TPO, Irgacure 500, Irgacure 907, Esacure KIP 100F may be used alone because they can absorb the UV light of the first wavelength range and the UV light of the second wavelength range together.

According to one embodiment of the present invention, the content of the first photoinitiator may be about 0.5 to about 10 parts by weight or about 1 to about 5 parts by weight per 100 parts by weight of the first coating composition. When the content of the first photoinitiator is in said range, it is possible to achieve sufficient crosslinking photopolymerization without reducing the properties of the plastic film.

Meanwhile, in the method for preparing the plastic film of the present invention, the first coating composition may further include typical additives used in the art to which the present invention pertains such as a surfactant, a yellowing inhibitor, a leveling agent, an antifouling agent and the like in addition to the ingredients disclosed above. Here, the content of the additives may be variously adjusted in the range without deteriorating the properties of the first coating composition of the present invention, and thus the content is not particularly limited.

According to one embodiment of the present invention, for example, the first coating composition may include a surfactant as an additive. The surfactant may be a 1- or 2-functional fluorine acrylate, a fluorine surfactant, or a silicon surfactant. Furthermore, the composition may include a yellowing inhibitor as an additive. The yellowing inhibitor may be a benzophenone-based compound or a benzotriazole-based compound.

And, in the method for preparing the plastic film of the present invention, the first coating composition may be solvent-free but it may further include an organic solvent selectively for controlling the viscosity and the flowability of the composition and increasing the coatability of the composition on the supporting substrate in the coating process.

Examples of the organic solvent available in the present invention may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

When the organic solvent is added to the first coating composition in the method for preparing the plastic film of the present invention, the organic solvent may be used so that the weight ratio of the first coating composition and the organic solvent is about 70:30 to about 99:1. When the first coating composition of the present invention has a high solid content like above, the viscosity of the composition may increase and it makes it possible to form a thick coating layer, for example, a coating layer having the thickness of 50 μm or more.

According to one embodiment of the present invention, the viscosity of the first coating composition is not limited particularly if it has a proper flowability and coatability, but it may have high viscosity because it has relatively high solid content. For example, the first coating composition of the present invention may have a viscosity of about 50 to about 1,200 cps, or about 100 to about 1,200 cps, or about 150 to about 1,200 cps at 25° C.

The first coating composition including said ingredients is coated on one side of the supporting substrate. At this time, any method that is available in the art would be used in the application of the first coating composition without particular limitations. For example, the coating composition may be applied by bar coating, knife coating, roll coating, blade coating, die coating, micro-gravure coating, comma coating, slot die coating, lip coating, solution casting, and the like.

And, the first coating composition may be coated to have the thickness of about 50 to about 150 μm, or about 70 to about 100 μm when it is completely cured. When the first coating composition is coated in said range, it is possible to prepare the plastic film of high hardness without curling or cracking generation.

After the first coating composition is coated, the step of stabilizing the coating face of the first coating composition may be carried out selectively. For example, the stabilizing step may be carried out by treating the supporting substrate on which the first coating composition is coated at a certain temperature. In this, the coating face can be flattened and more stabilized by volatilizing a volatile matter included in the first coating composition.

The UV light having the first wavelength is provided to one side of the supporting substrate on which the first coating composition is coated for carrying out the first photo-curing of the first coating composition.

The first wavelength may correspond to the UV light of short wavelength range, for example, about 280 to less than about 320 nm.

The first photo-curing step may be carried out until the first binder is partially crosslinked. Here, the meaning of "partially crosslinked" is that the first binder is only partially crosslinked below 100% if 100% means that the first binder is substantially completely crosslinked. For example, according to one embodiment of the present invention, the first photo-curing step may be carried out until about 30 to about 80 mole %, or about 30 to about 60 mole %, or about 40 to about 50 mole % of the photo-curable functional groups included in the first binder are crosslinked.

The degree of crosslinking of the first binder can be evaluated by measuring the quantity (mole) of the functional groups, namely, double bonds (C=C), left in the first binder by using an IR spectrometer, and comparing the same with the quantity of the functional groups before the photo-curing.

According to the method for preparing the plastic film of the present invention, the first binder of the coating composition coated on one side of the supporting substrate is not cured completely at once, and only part of the functional groups of the first binder, for example, about 30 to about 80 mole %, or about 30 to about 60 mole %, or about 40 to about 50 mole % of the same, is cured.

Generally, acrylate binders may generate curing shrinkage or curling phenomenon that the supporting substrate rolls up with the coating layer because of the curing shrinkage in the photo-curing step. The curling phenomenon means that edges of a flat film bend or roll up curvedly when the film is positioned on a flat surface, and it occurs because the acrylate compound contracts in the photo-curing step by a UV light.

Particularly, for use as a cover for mobile terminals such as smart phones or tablet PCs, it is important to improve the hardness or impact resistance of the plastic film to the level of replacing glass, and thus basically the coating layer should be of a certain thickness or more, for example, 50 μm or more, or 70 μm or more, or 100 μm or more, to improve the hardness of the plastic film. However, as the coating layer increases in thickness, the curling phenomenon due to the curing shrinkage increases and the adhesion force decreases, and the plastic film is prone to rolling up. Therefore, it is possible to carry out a process for flattening the supporting substrate in addition but it is not preferable because cracking of the coating layer may occur in the flattening process. Accordingly, it is difficult to prepare the plastic film having high hardness sufficient to replace glass without decrease of properties.

According to the method for preparing the plastic film of the present invention, the curing shrinkage of the first coating composition can be reduced by partially curing the photo-curable functional groups of the first binder, for example, until about 30 mole % to about 80 mole % of the same is crosslinked, instead of completely curing the first coating composition, in the step of carrying out the first photo-curing by providing the UV light having the first wavelength to the side on which the first coating composition is coated. By this, the plastic film that exhibits not only high hardness but also excellent physical and optical properties without curling or cracking generation can be prepared.

According to one embodiment of the present invention, for example, after the first coating composition is coated and photo-cured on the substrate in the first photo-curing step, the maximum distance of each edge or side of the supporting substrate cut into the size of 10 cm×10 cm apart from the plane may be about 25 mm, or about 20 mm, or about 15 mm.

Furthermore, the partially cured first coating composition is secondarily cured in the second photo-curing step disclosed below by providing the UV light to the back side, namely, the opposite side on which the first coating composition is not coated, and thus the flat plastic film can be obtained by offsetting the curling generated in the first photo-curing step in the opposite direction.

The dosage of UV light having the first wavelength may be, for example, about 20 to about 600 mJ/cm$^2$ or about 50 to about 500 mJ/cm$^2$. Any light source that can be used in the art would be applied to the present invention without particular limitation. For example, a high-pressure mercury lamp, a metal halide lamp, a black light fluorescent lamp and the like may be used. The first photo-curing step may be carried out by irradiating UV light at above dosage for about 30 sec to about 15 min, or for about 1 to about 10 min.

After the first coating composition is coated and the first photo-curing step is carried out, the second coating composition is coated on the other side of the supporting substrate. The second coating composition includes the second binder, the second inorganic particles, and the second photoinitiator.

According to one embodiment of the present invention, the content of the second binder may be about 35 to about 85 parts by weight or about 45 to about 80 parts by weight per 100 parts by weight of the second coating composition. When the content of the second binder is in said range, the plastic film that shows high hardness and is less prone to curling or cracking generation can be formed with excellent processability.

According to one embodiment of the present invention, the second binder includes a 3- to 6-functional acrylate compound and a thiol-containing compound and it may be equal to or different from the first binder.

Details and examples of the 3- to 6-functional acrylate compound and the thiol-containing compound are the same as in the first binder explained above, and they may be independently equal to or different from the first binder.

In the method for preparing the plastic film of the present invention, the second coating composition includes the second inorganic particles.

According to one embodiment of the present invention, the second inorganic particle may have a particle size of nanoscale. For example, inorganic particles having the diameter of about 100 nm or less, about 10 to about 100 nm, or about 10 to about 50 nm may be used. And, for example, silica particles, aluminum oxide particles, titanium oxide particles, or zinc oxide particles may be used as the second inorganic particles.

The hardness of the plastic film may be more improved by including the second inorganic particles.

According to one embodiment of the present invention, the content of the second inorganic particles may be about 10 to about 60 parts by weight or about 20 to about 50 parts by weight per 100 parts by weight of the second coating composition. When the content of the second inorganic particles is in said range, the properties of the second coating composition do not decrease and it is possible to achieve the effect of improving the hardness of the plastic film according to the addition of the inorganic particles.

In the method for preparing the plastic film of the present invention, the second coating composition includes the second photoinitiator.

Any material which can initiate the photo-polymerization by absorbing the UV light of the first wavelength range used in the second photo-curing step disclosed below may be used without limitations. More particularly, the photoinitiator absorbing the UV light of the first wavelength range may be 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, and the like. Furthermore, the photoinitiator may be commercially available, such as those sold under brand name, Irgacure 184, Irgacure 500, Irgacure 651, Irgacure 369, Irgacure 907, Darocur 1173, Darocur MBF, and so on.

Or, Darocur TPO, Irgacure 500, Irgacure 907, Esacure KIP 100F, and so on which can absorb the UV light of the first wavelength range and the UV light of the second wavelength range together may be used as the second photoinitiator.

According to one embodiment of the present invention, the content of the second photoinitiator may be about 0.5 to about 10 parts by weight or about 1 to about 5 parts by weight per 100 parts by weight of the second coating composition. When the content of the second photoinitiator is in said range, it is possible to achieve sufficient cross-linking photo-polymerization without reducing the properties of the plastic film.

Meanwhile, in the method for preparing the plastic film of the present invention, the second coating composition may further include typical additives used in the art to which the present invention pertains such as a surfactant, a yellowing inhibitor, a leveling agent, an antifouling agent and the like in addition to the ingredients disclosed above. Here, the content of the additives may be variously adjusted in the range without deteriorating the properties of the second coating composition of the present invention, and thus the content is not particularly limited.

According to one embodiment of the present invention, for example, the second coating composition may include a surfactant as an additive. The surfactant may be a 1- or 2-functional fluorine acrylate, a fluorine surfactant, or a silicon surfactant. Furthermore, the composition may include a yellowing inhibitor as an additive. The yellowing inhibitor may be a benzophenone-based compound or a benzotriazole-based compound.

The second coating composition may further include an organic solvent selectively for controlling the viscosity and the flowability of the composition and increasing the coatability of the composition on the supporting substrate in the coating process.

In the method for preparing the plastic film of the present invention, the second coating composition may be solvent-free but it may further include an organic solvent selectively for controlling the viscosity and the flowability of the composition and increasing the coatability of the composition on the supporting substrate in the coating process.

Examples of the organic solvent available in the present invention may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used alone or in combination.

When the organic solvent is added to the second coating composition in the method for preparing the plastic film of the present invention, the organic solvent may be used so that the weight ratio of the second coating composition and the organic solvent is about 70:30 to about 99:1. When the second coating composition of the present invention has a high solid content like above, the viscosity of the composition may increase and it makes it possible to form a thick coating layer, for example, a coating layer having the thickness of 50 µm or more.

According to one embodiment of the present invention, the viscosity of the second coating composition may have a viscosity of about 50 to about 1,200 cps, or about 100 to about 1,200 cps, or about 150 to about 1,200 cps at 25 r as in the first coating composition.

The second coating composition including said ingredients is coated on the other side of the supporting substrate, namely, on the opposite side of the face on which the first coating composition is coated. At this time, any method that is available in the art would be used in the application of the second coating composition without particular limitations. For example, the coating composition may be applied by bar coating, knife coating, roll coating, blade coating, die coating, micro-gravure coating, comma coating, slot die coating, lip coating, solution casting, and the like.

And, the second coating composition may be coated to have the thickness of about 50 to about 150 µm, or about 70 to about 100 µm when it is completely cured. When the second coating composition is coated in said range, it is possible to prepare the plastic film of high hardness without curling or cracking generation.

After the second coating composition is coated, the step of stabilizing the coating face of the second coating composition may be carried out selectively. For example, the stabilizing step may be carried out by treating the supporting substrate on which the second coating composition is coated at a certain temperature. In this, the coating face can be flattened and more stabilized by volatilizing a volatile matter included in the second coating composition.

As disclosed above, the second photo-curing step is carried out by providing the UV light having the first wavelength and the second wavelength that is longer than the first wavelength together to the opposite side of the supporting substrate on which the second coating composition is coated. According to one embodiment of the present invention, the first wavelength may be about 280 to less than about 320 nm and the second wavelength may be about 320 to about 400 nm.

The UV light of the first wavelength photo-cures the second coating composition, and the UV light of the second wavelength that is longer than the first wavelength reaches the first coating composition on the opposite side by passing through the supporting substrate and the second coating composition coated on the substrate and photo-cures the first coating composition, at the same time. In the second photo-curing step, the rest of the first coating composition which is partially cured in the first photo-curing step can be cured. Furthermore, since the UV radiation is provided to the opposite side of the face on which the first coating composition is coated in the second photo-curing step, the flat plastic film can be obtained by offsetting the curling generated due to the curing shrinkage in the first photo-curing step in the opposite direction. Therefore, the method does not need an additional flattening process.

As disclosed above, according to the method for preparing the plastic film of the present invention, curling or cracking which may be caused when the coating composition is coated thick can be prevented by carrying out 2-step photo-curing process consisting of the first photo-curing step for partially curing the first binder of the first coating composition coated on one side of the supporting substrate and the second photo-curing step for curing the second binder of the second coating composition coated on the other side of the supporting substrate and the rest of the first binder. By this, the plastic film that exhibits not only high hardness but also excellent physical and optical properties without curling or cracking generation can be prepared.

According to the 2-step photo-curing process, the first coating layer is formed on one side of the supporting substrate and the second coating layer is formed on the other side of the supporting substrate. The thicknesses of the first coating layer and the second coating layer may be about 50 to about 150 µm or about 70 to about 100 µm independently equally or differently.

When the plastic film obtained according to the method of the present invention is positioned on a plane after exposing the same to a temperature of 50° C. or more and a humidity of 80% or more for 70 hrs or more, the maximum distance of each edge or side of the plastic film apart from the plane may be about 2.0 mm or less, about 1.0 mm or less, or about 0.5 mm or less. More particularly, when the plastic film is positioned on a plane after exposing the same to a temperature of 50° C. to 90° C. and a humidity of 80% to 90% for 70 to 100 hrs, the maximum distance of each edge or side of the plastic film apart from the plane may be about 2.0 mm or less, about 1.0 mm or less, or about 0.5 mm or less.

FIGS. 1 to 4 are the drawings briefly illustrating the processes of preparing the plastic film according to one embodiment of the present invention.

Figure 1:
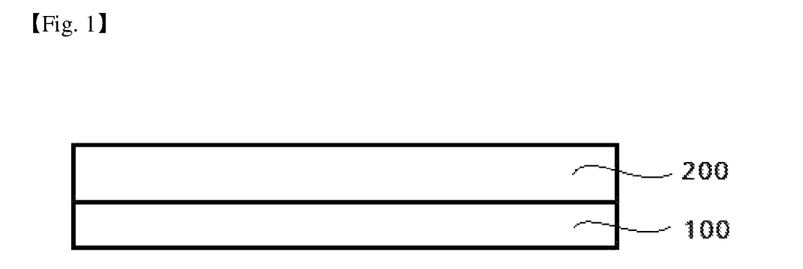
FIGS. 1 to 4 are the drawings briefly illustrating the process of preparing the plastic film according to one embodiment of the present invention.

Referring to FIG. 1, the first coating composition 200 is coated on one side of the supporting substrate 100, at first.

Details of the ingredients of the first coating composition 200 are the same as disclosed above. Any method that is available in the art would be used in the application of the first coating composition 200 without particular limitations. For example, the coating composition may be applied by bar coating, knife coating, roll coating, blade coating, die coating, micro-gravure coating, comma coating, slot die coating, lip coating, solution casting, and the like. Furthermore, the first coating composition 200 may be coated to have the thickness of about 50 to about 150 µm, or about 70 to about 100 µm when it is completely cured.

Figure 2:
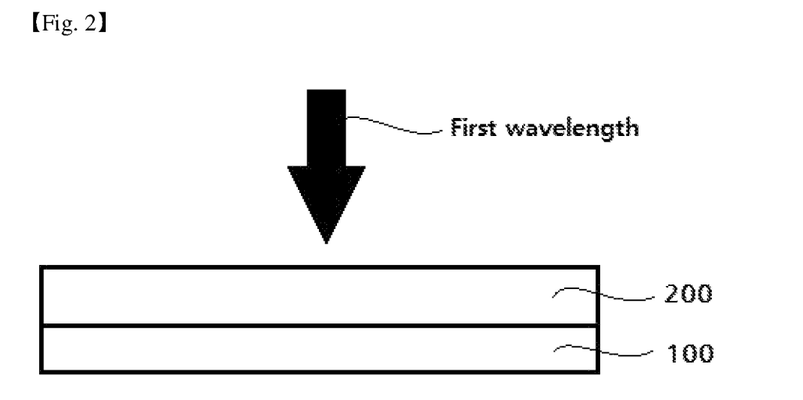

FIG. 2 is the drawing illustrating the first photo-curing step of exposing the side on which the first coating composition 200 is coated to the UV light having the first wavelength.

Referring to FIG. 2, the first photo-curing step is carried out by providing the UV light having the first wavelength to the side on which the first coating composition 200 is coated. The first wavelength may correspond to the UV light of short wavelength range, for example, about 280 to less than about 320 nm According to the method for preparing the plastic film of the present invention, the first binder of the coating composition 200 coated on one side of the supporting substrate 100 is not cured completely at once, and only part of the first binder, for example, about 30 to about 80 mole %, or about 30 to about 60 mole %, or about 40 to about 50 mole % of the same, is cured.

Figure 3:
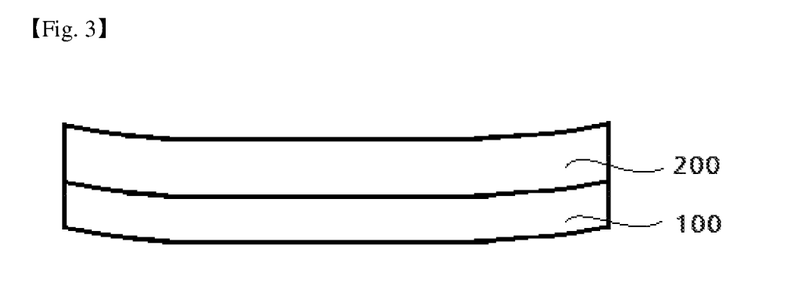

FIG. 3 is the drawing illustrating the partially cured first coating composition 200 after the first photo-curing step.

Referring to FIG. 3, the curing shrinkage or curling phenomenon that the supporting substrate 100 rolls up occurs in the first photo-curing step because the first binder included in the first coating composition 200 contracts during the curing.

According to one embodiment of the present invention, for example, after the first photo-curing step, the maximum distance of each edge or side of the supporting substrate 100 cut into the size of 10 cm×10 cm apart from the plane may be about 30 mm, or about 25 mm, or about 20 mm.

Figure 4:
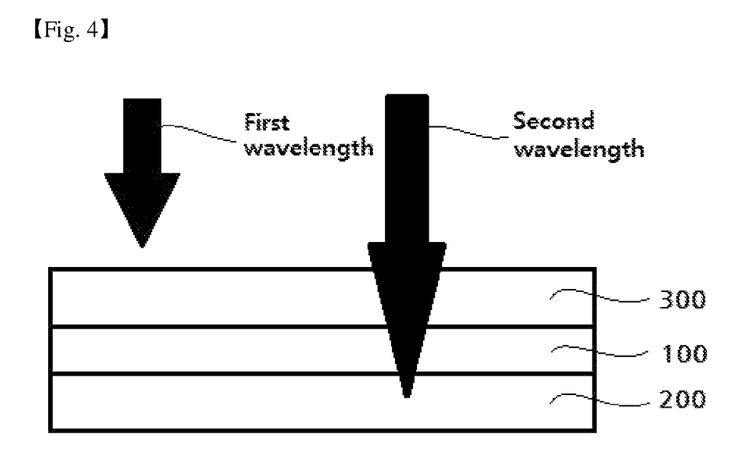

FIG. 4 is the drawing illustrating the step of coating the second coating composition 300 on the other side of the supporting substrate 100, and the second photo-curing step of exposing the other side on which the second coating composition 300 is coated to the UV light having the first wavelength and the second wavelength.

Details of the ingredients and the coating method of the second coating composition 300 are the same as disclosed above. Furthermore, the second coating composition 300 may be coated to have the thickness of about 50 to about 150 μm, or about 70 to about 100 μm when it is completely cured.

According to one embodiment of the present invention, the first wavelength may be about 280 to less than about 320 nm and the second wavelength may be about 320 to about 400 nm.

The UV light of the first wavelength photo-cures the second coating composition 300, and the UV light of the second wavelength that is longer than the first wavelength reaches the first coating composition 200 on the opposite side by passing through the supporting substrate 100 and the second coating composition 300 coated on the substrate and photo-cures the first coating composition 200, at the same time. In the second photo-curing step, the first coating composition 200 which is partially cured in the first photo-curing step is cured completely. Furthermore, since the UV radiation is provided to the opposite side of the face on which the first coating composition 200 is coated in the second photo-curing step, the flat plastic film can be obtained by offsetting the curling generated due to the curing shrinkage in the first photo-curing step in the opposite direction.

The plastic film obtained by the preparation method of the present invention exhibits high hardness, impact resistance, high transparency, durability, light resistance, light transmittance, and the like, and has useful applications in various fields as an alternative to glass.

Another embodiment of the present invention provides a plastic film of the present invention including a supporting substrate; the first coating layer which is formed on one side of the supporting substrate; and the second coating layer which is formed on another side of the supporting substrate, wherein the first and the second coating layers include a crosslinking copolymer of a 3- to 6-functional acrylate compound and a thiol-containing compound, and inorganic particles independently equally or differently, and the film shows a pencil hardness of 7H or more at the load of 1 kg.

According to one embodiment of the present invention, the first coating layer and the second coating layer may include about 40 to about 90 parts by weight of the crosslinking copolymer and about 10 to about 60 parts by weight of the inorganic particles, or about 50 to about 80 parts by weight of the crosslinking copolymer and about 20 to about 50 parts by weight of the inorganic particles independently equally or differently. When the first coating layer and the second coating layer include the crosslinking copolymer and the inorganic particles in said weight ratio, the plastic film that shows high hardness and is less prone to curling or cracking generation can be formed with excellent processability.

According to one embodiment of the present invention, the thicknesses of the first coating layer and the second coating layer may be about 50 to about 150 μm or about 70 to about 100 μm independently equally or differently. As disclosed in above preparation method, in the plastic film of the present invention, curling or cracking which may be caused when the coating composition is coated thick can be prevented by carrying out 2-step photo-curing process consisting of the first photo-curing step for partially curing the first binder of the first coating composition coated on one side of the supporting substrate and the second photo-curing step for curing the second binder of the second coating composition coated on the other side of the supporting substrate and the rest of the first binder. Accordingly, the plastic film that exhibits not only high hardness by forming thick coating layers of 50 μm or more but also excellent physical and optical properties without curling or cracking generation can be prepared.

The first coating layer is formed by coating the first coating composition including the first binder, the first inorganic particles, and the first photoinitiator on one side of the supporting substrate and photo-curing the same. And, the second coating layer is formed by coating the second coating composition including the second binder, the second inorganic particles, and the second photoinitiator on the other side of the supporting substrate and photo-curing the same.

In addition, details and examples of the supporting substrate and the binders, the inorganic particles, the photoinitiators, and so on for forming the first and the second coating layers are the same as in the preparation method disclosed above.

The plastic film of the present invention shows high hardness sufficient to replace glasses for various display windows or front panels, and it may have a pencil hardness of 7H or more, 8H or more, or 9H or more at the load of 1 kg.

The plastic film of the present invention may have a light transmittance of about 91.0% or more, or about 92.0% or more, and a haze of about 1.0% or less, about 0.5% or less, or about 0.4% or less.

And, when the plastic film of the present invention is positioned on a plane after exposing the same to a temperature of 50° C. or more and a humidity of 80% or more for 70 hrs or more, the maximum distance between the plane and each edge or side of the plastic film may be about 2.0 mm or less, about 1.0 mm or less, or about 0.5 mm or less. More particularly, when the plastic film of the present invention is positioned on a plane after exposing the same to a temperature of 50° C. to 90° C. and a humidity of 80% to 90% for 70 to 100 hrs, the maximum distance between the plane and each edge or side of the plastic film may be about 2.0 mm or less, about 1.0 mm or less, or about 0.5 mm or less.

Furthermore, the plastic film of the present invention may show an initial color b value of about 1.0 or less. And, the difference between the initial color b and the color b measured after exposing the film to UV-B light from an ultraviolet lamp for 72 hrs or more may be about 0.5 or less, or about 0.4 or less.

The plastic film of the present invention may have excellent impact resistance enough to replace glass. For example, the plastic film of the present invention may not crack even after the steel bead weighing 22 g is freely dropped from the height of 40 cm thereto.

Like this, the plastic film of the present invention can be used in various fields and, for example, it may be applied to touch panels of mobile terminals, smart phones or tablet PCs, and covers or device panels for various displays as an alternative to glass.

Hereinafter, the present invention will be explained in more detail with reference to the following examples. However, these examples are only to illustrate the invention, and the scope of the invention is not limited thereto.

EXAMPLES

Example 1

A first coating composition was prepared by mixing 20 g of pentaerythritol triacrylate (PETA), 40 g of trimethylolpropane triacrylate (TMPTA), 10 g of pentaerythritol tris(3-mercaptopropionate), 40 g of silica nanoparticles with a particle diameter of 20-30 nm, 2 g of a photoinitiator (proprietary name: Darocur TPO), 1 g of a benzotriazole-based yellowing inhibitor (proprietary name: Tinuvin 400), and 0.5 g of a fluorine surfactant (proprietary name: FC4430) with methylethylketone (MEK) so that the solid content was 85%.

A second coating composition was also prepared according to above method.

The first coating composition was coated on one side of a PET supporting substrate having the thickness of 188 an and the size of 15 cm×20 cm. Subsequently, a first photo-curing step was carried out by exposing the coated composition to the UV light of 290-320 nm by using a metal halide lamp until 40 mole % of the binder component in the first coating composition was cured.

The second coating composition was coated on the back side of the supporting substrate. Subsequently, a second photo-curing step was carried out by exposing the coated composition to the UV light of 280-350 nm by using a black light fluorescence lamp and a plastic film was obtained. The thickness of a first and a second coating layers formed both sides of the supporting substrate was 70 μm respectively after the curing was completed.

Example 2

A plastic film was obtained substantially according to the same method as in Example 1, except that 5 g of pentaerythritol tris(3-mercaptopropionate) was used.

Example 3

A plastic film was obtained substantially according to the same method as in Example 1, except that 5 g of pentaerythritol tris(3-mercaptopropionate) was used and the thickness of a first and a second coating layers formed both sides of the supporting substrate was 90 μm respectively.

Example 4

The plastic film was obtained substantially according to the same method as in Example 1, except that 40 g of pentaerythritol triacrylate (PETA) and 20 g of trimethylolpropane triacrylate (TMPTA) were used.

Comparative Example 1

A first coating composition was prepared by mixing 20 g of pentaerythritol triacrylate (PETA), 40 g of trimethylolpropane triacrylate (TMPTA), 40 g of silica nanoparticles with a particle diameter of 20-30 nm, 2 g of a photoinitiator (proprietary name: Darocur TPO), 1 g of a benzotriazole-based yellowing inhibitor (proprietary name: Tinuvin 400), and 0.5 g of a fluorine surfactant (proprietary name: FC4430) with methylethylketone (MEK) so that the solid content was 85%.

A second coating composition was also prepared according to above method.

Subsequent processes for preparing a plastic film were the same as in Example 1.

Comparative Example 2

A first and a second coating compositions were prepared according to the same method as in Example 1.

The first coating composition was coated on one side of a PET supporting substrate having the thickness of 188 an and the size of 15 cm×20 cm. Subsequently, a first photo-curing step was carried out by exposing the coated composition to the UV light of 290-320 nm by using a metal halide lamp until the binder component in the first coating composition was completely cured.

Subsequent processes for preparing a plastic film were the same as in Example 1.

Comparative Example 3

A plastic film was obtained substantially according to the same method as in Comparative Example 1, except that 40 g of pentaerythritol triacrylate (PETA) and 20 g of trimethylolpropane triacrylate (TMPTA) were used.

The ingredients and the contents of the first and the second coating compositions of Examples 1 to 4 and Comparative Examples 1 to 3 are listed in Table 1 below.

TABLE 1

| | Binder | | | |
|---|---|---|---|---|
| No. | 3-6 Functional Acrylate | Thiol-containing Compound | Inorganic Particles | Thickness of Coating Layer. |
| Example 1 | PETA 20 g, TMPTA 40 g | 10 g | 40 g | 70 μm |
| Example 2 | PETA 20 g, TMPTA 40 g | 5 g | 40 g | 70 μm |
| Example 3 | PETA 20 g, TMPTA 40 g | 5 g | 40 g | 90 μm |
| Example 4 | PETA 40 g, TMPTA 20 g | 10 g | 40 g | 70 μm |
| Comparative Example 1 | PETA 20 g, TMPTA 40 g | — | 40 g | 70 μm |
| Comparative Example 2 | PETA 20 g, TMPTA 40 g | 10 g | 40 g | 70 μm |
| Comparative Example 3 | PETA 40 g, TMPTA 20 g | — | 40 g | 70 μm |

Test Examples

Measuring Methods

1) Pencil Hardness

Pencil hardness was evaluated according to the Japanese Standard JIS K5400. In this regard, a pencil hardness meter was reciprocated three times on the plastic film under a load of 1.0 kg to determine the hardness at which no scratches appeared.

2) Curl Property

After the first coating composition was coated on the supporting substrate and the first photo-curing step was carried out, the coated film was cut into the size of 10 cm×10 cm and it was placed on a flat plane. the maximum distance of each edge or one side of the film apart from the plane was measured.

3) Light Resistance

Differences in color b value of the plastic films before and after exposure to UV-B light from an UV lamp for 72 hrs or more were measured.

4) Transmittance and Haze

Transmittance and haze were measured by using a spectrophotometer (equipment name: CHO-400))

5) Curl Property at High Humidity and Temperature

After a plastic film piece with dimensions of 10 cm×10 cm was stored for 72 hrs in a chamber maintained at the temperature of 85° C. and the humidity of 85%, it was placed on a flat plane and the maximum distance of each edge or one side of the film apart from the plane was measured.

6) Impact Resistance

The impact resistance was evaluated by determining whether or not the plastic film was cracked when a 22 g steel ball was dropped thereon from a height of 40 cm. The plastic film was evaluated as OK when it was not cracked, and as NG when it was cracked.

The results of the measured properties are summarized in Table 2 below.

TABLE 2

|  | Examples | | | | Comparative Examples | | |
|---|---|---|---|---|---|---|---|
|  | 1 | 2 | 3 | 4 | 1 | 2 | 3 |
| Pencil hardness | 8H | 9H | 9H | 9H | 9H | 9H | 9H |
| Curl property | 7 mm | 9 mm | 8 mm | 10 mm | 15 mm | 19 mm | 18 mm |
| Light resistance | 0.3 | 0.22 | 0.22 | 0.25 | 0.32 | 0.35 | 0.45 |
| Transmittance | 91.7 | 91.9 | 91.5 | 91.7 | 91.6 | 91.6 | 91.6 |
| Haze | 0.5 | 0.6 | 0.63 | 0.6 | 0.5 | 0.5 | 0.48 |
| Curl property at high humidity & temperature | 0.3 mm | 0.4 mm | 0.4 mm | 0.5 mm | 0.8 mm | 0.9 mm | 1.0 mm |
| Impact resistance | OK | OK | OK | OK | NG | NG | NG |

As shown in Table 2, all of the plastic films obtained by the preparation methods of Examples 1 to 4 exhibit good properties. However, the films of Comparative Examples 1 to 3 could not show sufficient impact resistance and curl property.

DESCRIPTION OF SYMBOLS

100: Supporting substrate
200: The first coating composition
300: The second coating composition

What is claimed is:

1. A plastic film, including:
a supporting substrate;
a first coating layer which is formed on one side of the supporting substrate; and
a second coating layer which is formed on another side of the supporting substrate,
wherein a first and a second coating layers include a crosslinking copolymer of a 3- to 6-functional acrylate compound and a thiol-containing compound, and inorganic particles independently equally or differently, and
the plastic film shows a pencil hardness of 8H or more at the load of 1 kg,
wherein the thickness of the first coating layer and the second coating layer is 50 to 150 μm independently equally or differently,
wherein when the plastic film is positioned on a flat plane after exposing the same to a temperature of 50° C. or more and a humidity of 80% or more for 70 hrs or more, the maximum distance of each edge or side of the plastic film apart from the plane is 2.0 mm or less.

2. The plastic film according to claim 1, wherein the first coating layer and the second coating layer include 40 to 90 parts by weight of the crosslinking copolymer and 10 to 60 parts by weight of the inorganic particles independently equally or differently.

3. The plastic film according to claim 1, wherein the weight ratio of the 3- to 6-functional acrylate compound and the thiol-containing compound which form the crosslinking copolymer is 99:1 to 60:40.

4. The plastic film according to claim 1, wherein the 3- to 6-functional acrylate compound includes at least one selected from the group consisting of trimethylolpropane triacrylate (TMPTA), trimethylolpropaneethoxy triacrylate (TMPEOTA), glycerin-propoxylated triacrylate (GPTA), pentaerythritol triacrylate (PETA), and dipentaerythritol hexaacrylate (DPHA).

5. The plastic film according to claim 1, wherein the thiol-containing compound includes at least one selected from the group consisting of pentaerythritol tetrakis thioglycolate, pentaerythritol tetrakis(2-mercaptoacetate), pentaerythritol tris(3-mercaptoacetate), trimethylolpropane tris (3-mercaptopropionate), trimethylolpropane tetrakis(3-mercaptopropionate), trimethylolpropane tris(3-mercaptobutylrate), mercaptopropyl isobutyl silsesquioxane, and mercaptopropyl isooctyl silsesquioxane.

6. A method for preparing the plastic film according to claim 1, including the steps of:
coating a first coating composition including a first binder, first inorganic particles, and a first photoinitiator on one side of a supporting substrate;
carrying out a first photo-curing by exposing the side on which the first coating composition is coated to UV light having a first wavelength until the first binder is partially crosslinked;
coating a second coating composition including a second binder, second inorganic particles, and a second photoinitiator on the other side of the supporting substrate; and
carrying out a second photo-curing by exposing the other side on which the second coating composition is coated to UV light having the first wavelength and a second wavelength that is longer than the first wavelength,
wherein the first binder and the second binder are equal to or different from each other and include a 3- to 6-functional acrylate compound and a thiol-containing compound independently.

7. The method according to claim 6, wherein the first photo-curing step is carried out until 30 to 80 mole % of the first binder is crosslinked.

8. The method according to claim 6, wherein the UV light of the second wavelength photo-cures the first binder in the second photo-curing step.

9. The method according to claim 6, wherein the UV light of the first wavelength photo-cures the second binder in the second photo-curing step.

10. The method according to claim 6, wherein the first wavelength is 280 to less than 320 nm.

11. The method according to claim 6, wherein the second wavelength is 320 to 400 nm.

12. The method according to claim 6, wherein the thiol-containing compound includes at least one selected from the group consisting of pentaerythritol tetrakis thioglycolate, pentaerythritol tetrakis(2-mercaptoacetate), pentaerythritol tris(3-mercaptoacetate), trimethylolpropane tris(3-mercaptopropionate), trimethylolpropane tetrakis(3-mercaptopropionate), trimethylolpropane tris(3-mercaptobutylrate), mercaptopropyl isobutyl silsesquioxane, and mercaptopropyl isooctyl silsesquioxane.

13. The method according to claim 6, wherein the 3- to 6-functional acrylate compound includes at least one selected from the group consisting of trimethylolpropane triacrylate (TMPTA), trimethylolpropaneethoxy triacrylate (TMPEOTA), glycerin-propoxylated triacrylate (GPTA), pentaerythritol triacrylate (PETA), pentaerythritol tetraacrylate, and dipentaerythritol hexaacrylate (DPHA).

14. The method according to claim 6, wherein the first inorganic particles and the second inorganic particles are equal to or different from each other and the particle diameter thereof is 100 nm or less.

15. The method according to claim 6, wherein the first inorganic particles and the second inorganic particles are equal to or different from each other and include at least one selected from the group consisting of silica nano particles, aluminum oxide particles, titanium oxide particles, and zinc oxide particles.

* * * * *